United States Patent Office 3,290,406
Patented Dec. 6, 1966

3,290,406
PROCESS FOR DEHYDROGENATION
William C. Pfefferle, Middletown, N.J., assignor to Engelhard Industries, Inc., Newark, N.J., a corporation of Delaware
No Drawing. Filed June 2, 1965, Ser. No. 460,835
4 Claims. (Cl. 260—683.3)

This invention relates to a process for the dehydrogenation of hydrocarbons, and is a continuation-in-part of copending application, Serial No. 196,552, filed May 15, 1962, now abandoned.

In accordance with the aforesaid copending application, gas phase reactions wherein hydrogen is a product of the reaction are effected in the presence of a membrane which is selectively permeable to hydrogen and the hydrogen produced during the reaction is continuously removed from the reaction zone by permeation through such selectively permeable membrane. As a result of the continuous separation of hydrogen from the reaction zone, it becomes possible to utilize more economical reaction conditions, including by way of illustration, adjustment of reactant concentrations, to obtain improved product yields and conversions as compared to conventional operations under comparable conditions in the absence of hydrogen separation.

While the process described and claimed in the aforesaid copending application is applicable, in general, to a wide variety of gas phase reactions wherein hydrogen is produced as a reaction product, the present invention is particularly concerned with, and directed toward, an improvement in the process for dehydrogenating hydrocarbons.

The dehydrogenation of hydrocarbons is an important reaction in commercial chemical and petrochemical operations. For example, normal butane is dehydrogenated to butenes, normal butane and butenes are dehydrogenated to form butadiene, isoamylenes are dehydrogenated to form isoprene and ethylbenzene is dehydrogenated to form styrene. Such dehydrogenation can be effected in the presence or absence of a catalyst, although catalytic dehydrogenation is generally employed in commercial processes.

Such dehydrogenation reactions are endothermic and thus have more favorable equilibrium constants at higher temperatures. For example, for the dehydrogenation of propane:

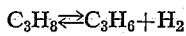

$$C_3H_8 \rightleftarrows C_3H_6 + H_2$$

at

1400° F., $K_p=5.2$ (approx.)
1200° F., $K_p=0.85$ (approx.)
1000° F., $K_p=0.08$ (approx.)

It can be seen that 1400° F. is a far more favorable operating temperature than 1000° F. to achieve maximum conversion of propane. However, higher temperatures also favor thermal cracking reactions and coking, while lower temperatures favor the ratio of dehydrogenation over cracking, reduce the coke formation, and permit the use of more active and more selective catalysts. For example, in a typical conventional method for producing propylene by dehydrogenation of propane, a temperature of 1490° F. and a pressure of 9 p.s.i.g. are employed. No catalyst is used because of the high temperature. Although about 60 to 75 percent of the propane is converted in this thermal dehydrogenation process, it can be estimated that the yields are poor because of the competing thermal cracking reactions which high temperatures favor.

In order to overcome the disadvantages of higher temperatures and achieve greater selectivity in the reactions, conventional methods must operate at very low pressures. For example, in a typical method described for the catalytic dehydrogenation of butane (for which reaction equilibrium constants indicate that somewhat lower temperatures can be employed than in the dehydrogenation of propane), the operating temperature of 1150° F. required that a pressure of 3 p.s.i.a. be used. This means that in order to operate at lower temperatures, either a diluent or vacuum must be employed, which adds to the cost of the process. In addition, only a 9-minute cycle life was reported as commercially attained. Under these conditions, a waste of 7 percent results for every 10 percent of butadiene product. This waste can be attributed in part to the lack of selectivity of the catalyst used under these conditions.

Using the $K_p$ for propane to propylene as given above, at 1400° F. and 3 atmospheres, less than about 79 percent conversion of the propane is obtained using conventional techniques. However, if the partial pressure of the hydrogen in the reaction zone is reduced to 0.3 p.s.i., the same percent conversion of propane can be obtained at 1000° F.

In accordance with the present invention, desirable low partial pressures of hydrogen are achieved in the dehydrogenation of hydrocarbon feeds by effecting the dehydrogenation while continuously separating hydrogen from the reaction zone by diffusion through a non-porous membrane selectively permeable to hydrogen, and reacting the diffused hydrogen with oxygen on the downstream side of the membrane in order to substantially instantaneously reduce the partial pressure of hydrogen on the downstream side of the membrane to zero. Since the rate of hydrogen diffusion through the membrane is a function of the hydrogen partial pressure difference across the membrane, the removal of hydrogen produced in the dehydrogenation reaction zone can be effected with a high degree of efficiency in accordance with the process of this invention.

The process of the present invention offers numerous advantages in the dehydrogenation of hydrocarbons. For example, such dehydrogenations are ordinarily effected in the presence of substantial quantities of inert gases, such as carbon dioxide or nitrogen in order to reduce the hydrogen partial pressure. When steam is employed as a gaseous diluent, it serves the dual purpose of reducing the hydrogen partial pressure and also facilitates the removal of carbon from the catalyst. When the dehydrogenation is effected in accordance with the present invention, the amount of such diluent gases can be substantially reduced, or even completely dispensed with, thus increasing the capacity of the dehydrogenation reactor as well as providing economic advantages in reducing the heat requirements of the system. Further, hydrocarbon dehydrogenations are normally effected at atmospheric pressure, or slightly above, in order to maintain the lowest possible hydrogen partial pressure. The present invention permits such dehydrogenation reactions to be effected at more elevated pressure, for example up to 100 p.s.i.g. or even higher, because of the substantial reduction of hydrogen content in the reaction zone due to permeation of the hydrogen through the hydrogen-permeable membrane. Another advantage of the present process is to supply the heat to the dehydrogenation zone by the exothermic reaction of hydrogen and oxygen at the surface of the hydrogen-permeable membrane. Since dehydrogenation reactions are highly endothermic, the heat of the hydrogen combustion substantially reduces the input heat requirements of the system.

The process of the present invention can be employed for the dehydrogenation of various types of dehydrogenateable aliphatic, including cycloaliphatic, hydrocarbons, containing from 2 to 20 or more carbon atoms which may be cracked during the process. Suitable paraffins include for example branched or straight chain paraffins of about 4 to 8 carbon atoms, cyclic paraffins such as cyclopentane or cyclohexane and cycloparaffins having an aliphatic side chain that can undergo dehydrogenation as for example ethylcyclohexane to styrene. Aromatics containing aliphatic substituents such as ethyl, n-propyl, isobutyl, n-butyl groups can be employed in the process of this invention. The method of the present invention is of particular value in the dehydrogenation of branched, straight chain or cyclic olefins containing about 4 to 8 carbon atoms and which undergo dehydrogenation to diolefins. The method can be employed for the production of butadiene and/or isoprene from the dehydrogenation of normal butylenes and isoamylenes. The dehydrogenation of these and other dehydrogenateable hydrocarbons is well known in the art.

The reaction of the present invention can be effected under conventional dehydrogenation conditions, the exact set of conditions being dependent on the feedstock and product desired. Generally, temperatures in the range of about 800 to 1300° F. and pressure from about 0.05 to 200 p.s.i.g., preferably from atmospheric to 100 p.s.i.g., and weight hourly space velocity (WHSV) about 0.01 to 100, preferably 0.1 to 10. The reaction may be effected in the presence of any inert diluent gas such as nitrogen, methane, etc., to further reduce the partial pressure of the hydrogen in the dehydrogenation reactor zone.

The dehydrogenation can be effected thermally, or in the presence of conventional dehydrogenation catalysts well known to the art. Suitable catalysts used in the art of dehydrogenation of hydrocarbons include Standard Oil Development Company 1707 which is a combination of magnesium oxide, ferric oxide, chromium oxide and potassium oxide, Dow Type B which is a combination of nickel calcium phosphate and chromium oxide, and the like. Supported platinum group metal catalysts, e.g., platinum on a solid, non-acidic refractory metal oxide, have been proposed, and may be employed, for dehydrogenation in accordance with the present invention. Where the dehydrogenation is effected in a tubular reactor consisting of palladium or palladium alloy, the reactor will itself serve to a certain extent as a dehydrogenation catalyst.

The dehydrogenation of dehydrogenateable hydrocarbons is effected in accordance with the present invention by conducting the dehydrogenation in a reaction zone from which hydrogen is continuously removed by permeation through a non-porous membrane selectively permeable to hydrogen. For example, the reaction can be effected within a tubular reactor constructed of a hydrogen permeable material such as palladium or palladium-containing alloys. Where a catalyst is employed to promote the dehydrogenation reaction, the tubular reactor can be packed according to conventional techniques with such catalyst in pellet, pilled or other suitable form.

Suitable materials for the removal of hydrogen formed in the reaction zone are palladium and palladium alloys, e.g., palladium-silver alloys of the type disclosed in U.S. Patent No. 2,773,561. Such materials provide rapid diffusion of essentially completely pure hydrogen, the diffused gas containing less than 1 p.p.b. impurities. Palladium and its alloys are particularly useful in the process of the present invention since hydrogen diffuses through these materials at realistic commercial rates at temperatures ranging from about 200° C. to 1100° C., which temperature range broadly encompasses the effective temperature range for the dehydrogenation reaction.

In effecting the dehydrogenation, the hydrogen formed in the reaction zone and which passes through the hydrogen-permeable membrane is reacted with oxygen by contacting with a gaseous mixture containing oxygen, e.g., air, mixtures of air or oxygen with an inert diluent such as nitrogen and the like. The particular concentration of oxygen is not critical, but will be adjusted in order to effect the combustion of hydrogen at a rate which will provide desirable temperatures and avoid over-heating of the reactor. For example, pure $O_2$ or air may be used. Preferably the oxygen concentration will range from 0.1 to about 50% by volume. The oxygen-hydrogen reaction can be effected at atmospheric or superatmospheric pressure, for example up to about 200 p.s.i.g. It will be appreciated that the palladium or palladium alloy membrane serves in this regard as a catalyst to promote the combustion of oxygen (palladium is a well known catalyst for this reaction), and the oxidation is further enhanced by the fact that the diffused hydrogen is probably in the atomic form as it emerges from the palladium surface. Thus the combustion reaction is extremely fast, and hydrogen is substantially instantaneously consumed on the downstream side of the membrane.

The following example is included to further illustrate the present invention.

*Example*

In this example, a commercial hydrogen diffusion unit (Engelhard Diffuser HPD–20) consisting of a jacketed assembly of ⅛-inch palladium alloy tubes (palladium-25 wt. percent silver) was employed as the dehydrogenation reactor. Ethane was fed to the diffusion tubes at about 125 p.s.i.g., the palladium alloy tube serving as a dehydrogenation catalyst. The diffusion tubes were maintained at a temperature of about 700 to 850° F. On the downstream side of the tubes, a gaseous mixture of nitrogen and oxygen containing 0.7 vol. percent $O_2$ was fed at a pressure of about 100 p.s.i.g. A sample of the reaction effluent was collected during the 15 to 18th hours of operation, analyzed by IR and found to contain 0.7% ethylene. The following table shows details in this example.

TABLE

| Hours on Stream | 0/2 | 0/3 | 6/9 | 9/12 | 12/15 | 15/18 | 18/21 | 21/24 | 24/25 |
|---|---|---|---|---|---|---|---|---|---|
| Temp., ° F | 703 | 851 | 850 | 849 | 849 | 848 | 845 | 849 | 851 |
| Reactor Pressure, p.s.i.g | 123 | 124 | 124 | 124 | 124 | 124 | 124 | 124 | 124 |
| Oxidation Zone Pressure, p.s.i.g | 93 | 100 | 100 | 102 | 101 | 100 | 100 | 103 | 103 |
| Mol. Ratio $O_2/C_2H_6$ | 1.3 | .98 | .86 | .86 | 1.03 | 1.03 | .90 | .87 | .90 |
| Ethylene, percent in effluent | 0.5 | 0.58 | 0.71 | 0.6 | 0.66 | | 0.70 | | |

It will be appreciated that the dehydrogenation of ethane was effected at a relatively low temperature, in this example, but nevertheless substantial dehydrogenation was obtained even at these unfavorable conditions. With suitable adjustments in the reaction conditions, the yield of ethylene can be substantially improved.

What is claimed is:

1. In a process for the dehydrogenation of dehydrogenateable hydrocarbons is a reactor maintained under dehydrogenation conditions which preclude any substantial thermal cracking of the hydrocarbons including a temperature of about 800 to 1300° F. and a pressure in the range of 0.05 to 200 p.s.i.g., the improvement which comprises continuously removing hydrogen formed during the dehydrogenation from the reaction zone by diffusion through a non-porous membrane selectively permeable to hydrogen, and contacting the diffused hydrogen with oxygen-containing gas to effect substantially complete combustion thereof at the surface of the membrane.

2. The improved process of claim 1 wherein the feed is a dehydrogenateable aliphatic hydrocarbon of 2 to 20 carbon atoms.

3. The improved process of claim 1 wherein the nonporous membrane is composed of a material selected from the group consisting of palladium and palladium-containing alloys.

4. The improved process of claim 1 wherein the oxygen-containing gas contains from about 0.1 to 50 volume percent oxygen.

References Cited by the Examiner

UNITED STATES PATENTS

| | | | |
|---|---|---|---|
| 1,592,474 | 7/1926 | Szarvasy | 23—209.4 |
| 1,951,280 | 3/1934 | Hale et al. | 260—531 |
| 2,609,382 | 9/1952 | Mayland | 260—449.6 |
| 2,902,440 | 9/1959 | Beuther et al. | 208—213 |
| 2,986,641 | 5/1961 | Michels | 23—210 |

FOREIGN PATENTS 579,535    7/1959    Canada.

DELBERT E. GANTZ, *Primary Examiner.*

S. P. JONES, *Assistant Examiner.*